July 15, 1930.     A. J. GANGLE     1,770,883
CONVEYER FOR ELECTRICAL CONDUITS
Filed April 14, 1928
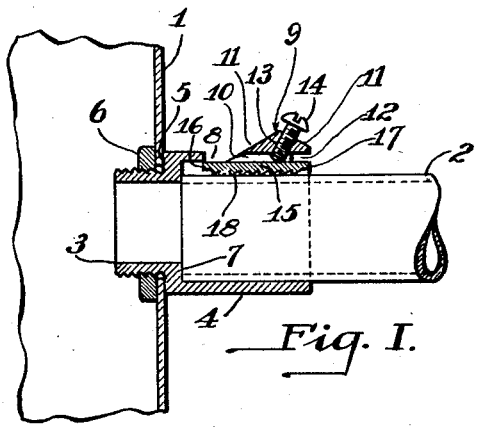
Fig. I.
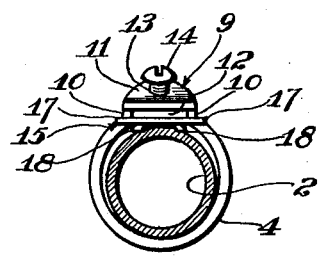
Fig. II.
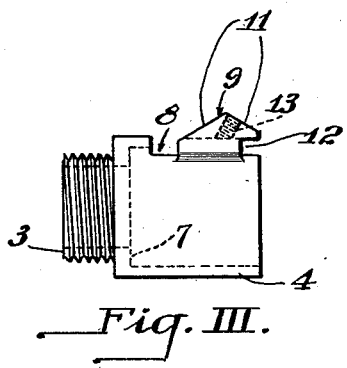
Fig. III.
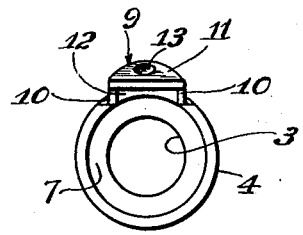
Fig. IV.
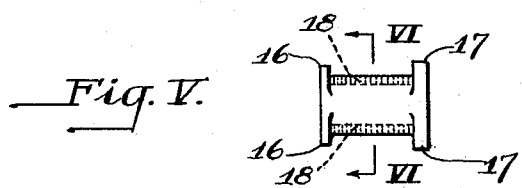
Fig. V.
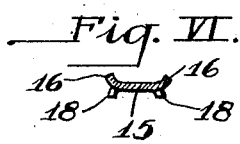
Fig. VI.
Fig. VII.
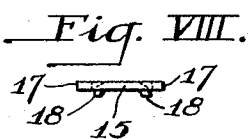
Fig. VIII.
WITNESS
INVENTOR Patented July 15, 1930

1,770,883

UNITED STATES PATENT OFFICE

ALBERT J. GANGLE, OF BADEN, PENNSYLVANIA, ASSIGNOR, BY MESNE ASSIGNMENTS, TO NATIONAL ELECTRIC PRODUCTS CORPORATION, A CORPORATION OF DELAWARE

CONNECTER FOR ELECTRICAL CONDUITS

Application filed April 14, 1928. Serial No. 269,987.

It is the object of the invention to provide an improved connecter for securing electrical conduits and cables to outlet boxes and other fittings, the distinguishing feature of which is the novel means whereby the connecter is caused to grasp and hold the conduit or cable in a firm mechanical and electrical union.

In the accompanying drawings Figure 1 is a sectional elevation showing a rigid conduit secured to an outlet box by a connecter embodying the invention. Figure 2 is a rear elevation, viewed from the right-hand side of Figure 1. Figure 3 is a side elevation of the integral body portion of the connecter, and Figure 4 is a rear elevation thereof. Figure 5 is a plan view of the gripping member. Figure 6 is a cross-section of the gripping member before it is fitted in place in the connecter, the section being taken on the line VI—VI of Figure 5. Figure 7 is a longitudinal section of the gripping member, and Figure 8 is an end view thereof.

The numeral 1 designates a portion of the wall of an outlet box or other fitting having an opening for the ends of electrical conductors in the conduit 2, which is shown as a rigid metallic conduit, but which may be a flexible metallic conduit or an armored cable. The connecter comprises the inner neck portion 3 which enters the opening in the outlet box and terminates at the shoulder 5, and the outer barrel portion 4 extending rearwardly from the shoulder 5 which latter bears against the outer face of the wall of the box. Any suitable means may be used for securing the connecter to the box. As shown in the drawings, the portion 3 of the connecter is threaded and is provided with a nut 6, which binds the shoulder 5 of the connecter against the outer face of the box wall surrounding the opening. The outer barrel portion 4 has an internal shoulder 7, and in its top wall is cut a transverse slot 8, behind which is formed a boss or arch 9, which is open between its opposite side walls 10 which are integral with the body 4, thus forming a longitudinal slot under the boss 9. The upper face of the boss 9 slopes downwardly and backwardly in an incline 11 terminating at the outer end of the connecter, and forming at such outer end a second rearwardly open transverse slot 12. Through the backwardly inclined portion 11 of the boss is bored the forwardly inclined threaded opening 13, through which works the binding-screw 14.

The gripping member 15 is a plate having the opposite forward ears 16, 16, and the rear ears 17, 17, resting in the slots 8 and 12 respectively, and thus supporting it loosely in the longitudinal slot in the top of the barrel 4 and underneath the boss 9. The lower face of gripping member 15 is provided with teeth 18, which are preferably pitched forwardly as shown in Figure 7, and are preferably arranged in rows along the opposite longitudinal edges of the body of the said member, as shown in Figures 5, 6, and 8. In order to facilitate the seating of the gripping member 15 in its place, it may be initially formed with its forward ears 16, 16 turned upwardly as shown in Figure 6, and when it has been brought into position, these ears are turned downwardly into the plane of the body of the member, as shown in Figures 5 and 8.

By reason of the loose support of the gripping member 15 in the slot formed in the barrel 4 of the connecter underneath the boss 9, the forward end of the conduit 2 may be slipped into the barrel 4 into contact with the internal shoulder 7. Then by driving down the screw 14 the gripping member is caused to bind the conduit tightly in place in the connecter. By reason of the forward inclination of the screw 14 it has a wedging action upon the member 15, forcing the latter both downwardly and slightly forwardly as well, thus wedging the end of the conduit tightly against the shoulder 7, and this forward wedging effect is augmented by the forward pitch of the teeth 18 on the under surface of the gripping member. These teeth 18 are caused to bite into the surface of the conduit and make an exceptionally good electrical union between the conduit and the connecter.

It will be understood that the present invention is not limited to the specific form of gripping member herein shown, nor to the specific means shown for causing it to bind upon the conduit, and that other structural variations may be made without departure from the invention.

I claim as my invention:

1. A connecter for electrical conduits comprising a forward portion with means for securing it to an outlet box and a rear portion adapted to receive a conduit, an opening through the wall of said outer portion and an arch extending transversely over said opening, a gripping member in said opening provided with teeth on its inner surface, and a forwardly inclined screw working in a threaded opening through said arch and adapted to press said binding member inwardly and forwardly.

2. A connecter for electrical conduits comprising, in combination, a barrel portion adapted to receive a conduit, an opening through the wall of said barrel portion and an arch extending transversely over said opening, a gripping member loosely supported in said opening and having on its inner surface a plurality of teeth, and means carried by said arch for forcing said gripping member inwardly and forwardly in contact with the surface of the conduit.

3. A connecter for electrical conduits comprising, in combination, a barrel portion adapted to receive a conduit, an opening through the wall of said barrel portion and an arch extending transversely over said opening, a gripping member loosely supported in said opening and having on its inner surface a row of teeth along each of its longitudinal edges, and a forwardly inclined screw in said arch adapted to force said gripping member inwardly and forwardly in contact with the surface of the conduit.

4. A connecter for electrical conduits comprising, in combination, a barrel portion adapted to receive a conduit, an opening through the wall of said barrel portion and an arch extending transversely over said opening, a gripping member loosely supported in said opening and having on its inner surface a plurality of forwardly pitched teeth, and a forwardly inclined screw in said arch adapted to force said gripping member inwardly and forwardly in contact with the surface of the conduit.

In testimony whereof I have hereunto set my hand.

ALBERT J. GANGLE.